(12) United States Patent
Wang et al.

(10) Patent No.: US 11,378,191 B2
(45) Date of Patent: Jul. 5, 2022

(54) DISTRIBUTION VALVE AND REFRIGERATION SYSTEM

(71) Applicant: Robert Bosch GmbH, Stuttgart (DE)

(72) Inventors: Haixiang Wang, Shanghai (CN); Thomas Helming, Baden-Baden (DE)

(73) Assignee: Robert Bosch GmbH, Stuttgart (DE)

( * ) Notice: Subject to any disclaimer, the term of this patent is extended or adjusted under 35 U.S.C. 154(b) by 261 days.

(21) Appl. No.: 16/819,759

(22) Filed: Mar. 16, 2020

(65) Prior Publication Data
US 2020/0300516 A1    Sep. 24, 2020

(30) Foreign Application Priority Data

Mar. 18, 2019    (CN) .................. 201910204500.X

(51) Int. Cl.
| | |
|---|---|
| *F16K 5/12* | (2006.01) |
| *F16K 11/087* | (2006.01) |
| *F16K 5/06* | (2006.01) |
| *F16K 11/085* | (2006.01) |
| *F25B 41/20* | (2021.01) |
| *B60H 1/00* | (2006.01) |

(52) U.S. Cl.
CPC .............. *F16K 5/12* (2013.01); *F16K 5/0689* (2013.01); *F16K 11/0856* (2013.01); *F16K 11/0873* (2013.01); *F16K 11/0876* (2013.01); *B60H 1/00485* (2013.01); *F25B 41/20* (2021.01)

(58) Field of Classification Search
CPC ............. F16K 11/0876; F16K 11/0873; F16K 5/0689; F16K 5/12; F16K 11/085; F16K 11/0856; F25B 41/20; F25B 41/24; F25B 41/28; F25B 41/31; F25B 41/325; B60H 1/00485; B60H 1/00885; F01P 2007/146; F01P 7/14

See application file for complete search history.

(56) References Cited

U.S. PATENT DOCUMENTS

| | | | | |
|---|---|---|---|---|
| 3,058,484 A | * | 10/1962 | Feiring ................... | F16K 5/202 137/328 |
| 3,214,135 A | * | 10/1965 | Hartmann ............. | F16K 5/0689 137/246.22 |
| 3,778,029 A | * | 12/1973 | Baker ................. | F16K 11/0873 251/315.1 |
| 4,762,301 A | * | 8/1988 | Wozniak ............... | F16K 27/067 251/315.14 |

(Continued)

*Primary Examiner* — David Colon-Morales

(74) *Attorney, Agent, or Firm* — Michael Best & Friedrich LLP

(57) ABSTRACT

A distribution valve comprises: a housing, and a spool in the housing, the spool mounted in a valve chamber so as to be rotatable along an axial axis, and the spool comprising a sidewall comprising a first spheroidal segment and a second spheroidal segment, a spool first port in the first spheroidal segment, and a spool second port in the second spheroidal segment; and an intermediate member mounted between the housing and the spool and fixed relative to the housing and in sliding contact with the sidewall of the spool in a sealed manner, wherein a first valve port is defined when the spool first port and an intermediate first port overlap, and a second valve port is defined when the spool second port and an intermediate second port overlap, wherein a degree of opening of the valve ports changes as the spool rotates relative to the housing.

20 Claims, 4 Drawing Sheets

(56) References Cited

U.S. PATENT DOCUMENTS

| | | | | |
|---|---|---|---|---|
| 5,820,133 | A * | 10/1998 | Altshuler | F16K 11/0856 |
| | | | | 277/630 |
| 7,887,024 | B2 * | 2/2011 | Timko | F16K 5/0668 |
| | | | | 251/315.08 |
| 9,670,825 | B2 * | 6/2017 | Murakami | F16K 11/085 |
| 9,695,734 | B2 * | 7/2017 | Carns | F16K 5/0605 |
| 9,897,217 | B2 * | 2/2018 | Greene | F16K 5/201 |
| 9,932,882 | B2 * | 4/2018 | Imasaka | F01P 7/14 |
| 10,280,829 | B2 * | 5/2019 | Shen | F16K 27/067 |
| 10,344,883 | B2 * | 7/2019 | Brazas | F16K 11/0876 |
| 10,352,460 | B2 * | 7/2019 | Jang | F16K 5/0678 |
| 10,544,725 | B2 * | 1/2020 | Schaefer | F16K 11/202 |
| 10,690,040 | B2 * | 6/2020 | Jang | F01P 7/16 |
| 10,712,061 | B2 * | 7/2020 | Tashiro | F25B 47/02 |
| 10,808,856 | B2 * | 10/2020 | Shen | F01P 3/20 |
| 10,883,619 | B2 * | 1/2021 | Smith | B01D 29/668 |
| 10,927,972 | B2 * | 2/2021 | Murakami | F16K 31/002 |
| 10,975,975 | B2 * | 4/2021 | Sato | F16K 31/535 |
| 11,098,807 | B2 * | 8/2021 | Suzuki | F16K 11/0856 |
| 11,117,441 | B2 * | 9/2021 | Kozasa | F25B 41/00 |
| 11,149,862 | B2 * | 10/2021 | Kanzaki | F16K 11/0876 |
| 11,204,191 | B2 * | 12/2021 | Nakajima | F25B 41/20 |
| 2001/0045231 | A1 * | 11/2001 | Monod | F16K 27/067 |
| | | | | 137/454.2 |
| 2008/0099712 | A1 * | 5/2008 | DeYoe | F16K 5/0626 |
| | | | | 251/315.01 |
| 2010/0200791 | A1 * | 8/2010 | Yung | F16K 5/0673 |
| | | | | 251/315.01 |
| 2015/0075202 | A1 * | 3/2015 | Okuda | F28F 1/32 |
| | | | | 62/324.4 |
| 2019/0017612 | A1 * | 1/2019 | Ikemoto | F01P 3/02 |
| 2019/0072191 | A1 * | 3/2019 | Shen | F16K 31/535 |
| 2019/0078692 | A1 * | 3/2019 | Bonomi | F16K 11/056 |
| 2020/0326104 | A1 * | 10/2020 | Lahnstein | F28F 19/00 |
| 2021/0088149 | A1 * | 3/2021 | Nomura | F16K 11/0873 |

* cited by examiner

DISTRIBUTION VALVE AND REFRIGERATION SYSTEM

BACKGROUND OF THE INVENTION

The present invention relates to the field of valves, in particular to a distribution valve and a refrigeration system having such a distribution valve.

Expansion valves are often disposed in fluid flow paths, in particular refrigeration system flow paths. Common expansion valves mainly take the form of needle valves. In fluid flow paths which include branches, a common design is for two or more flow valves to be disposed to respectively control the flow rate of each flow path.

SUMMARY OF THE INVENTION

An object of the present invention is to solve or at least alleviate the problem in the prior art.

According to some aspects, a distribution valve is provided, comprising:

a housing, comprising a valve chamber, a housing fluid port, a housing first port and a housing second port, wherein the housing fluid port, the housing first port and the housing second port are each in communication with the valve chamber;

a spool in the housing, the spool being mounted in the valve chamber so as to be rotatable relative to the housing along an axial axis Y, and the spool comprising a sidewall, a spool chamber, a spool fluid port, a spool first port and a spool second port, wherein the spool fluid port, the spool first port and the spool second port are each in communication with the spool chamber, and the sidewall comprises a first spheroidal segment and a second spheroidal segment, the spool first port being disposed in the first spheroidal segment, and the spool second port being disposed in the second spheroidal segment; and an intermediate member, mounted between the housing and the spool, the intermediate member being fixed relative to the housing and being in sliding contact with the sidewall of the spool in a sealed manner, the intermediate member comprising an intermediate first port and an intermediate second port, the intermediate first port being in communication with the housing first port, and the intermediate second port being in communication with the housing second port;

a first valve port being defined when the spool first port and the intermediate first port overlap, and a second valve port being defined when the spool second port and the intermediate second port overlap, wherein a degree of opening of the first valve port and the second valve port changes as the spool rotates relative to the housing.

According to other aspects, a refrigeration system is provided, the refrigeration system comprising the distribution valve according to various embodiments of the present invention.

BRIEF DESCRIPTION OF THE DRAWINGS

The content disclosed in the present invention will become easier to understand with reference to the drawings. Those skilled in the art will readily understand that these drawings are merely intended for explanatory purposes, and are not intended to limit the scope of protection of the present invention. Furthermore, similar numerals in the drawings are used to indicate similar components, wherein.

DETAILED DESCRIPTION

Figure 1:
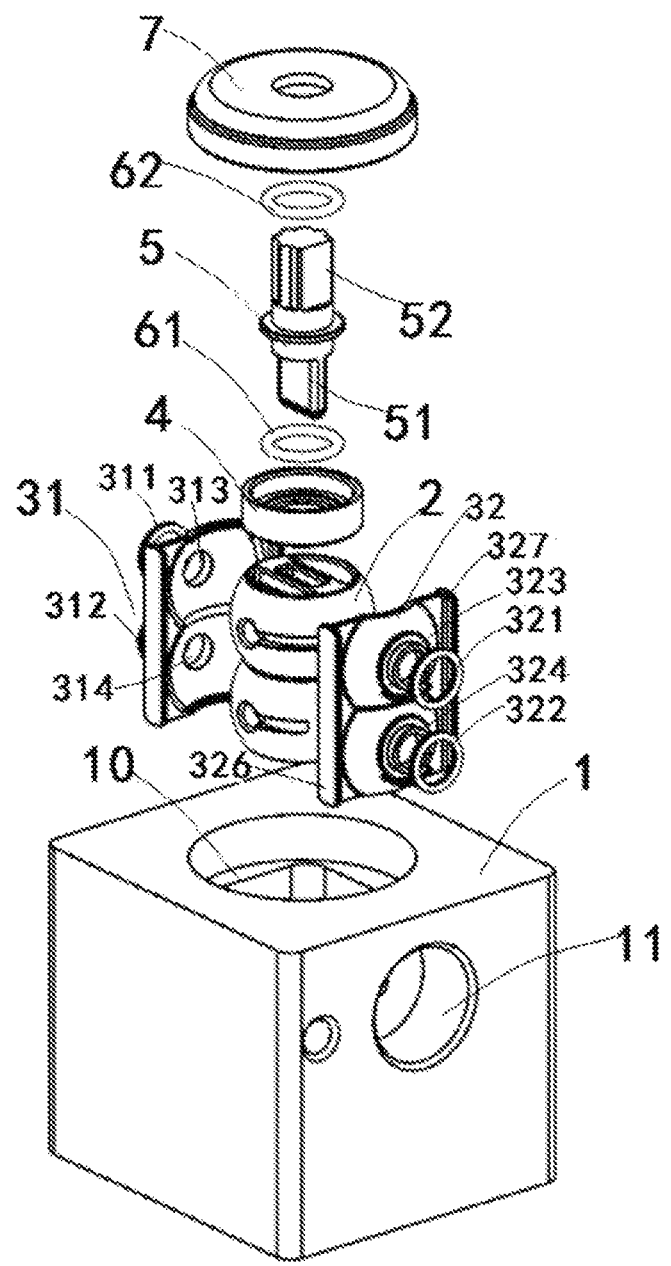
FIG. 1 shows an exploded view of a distribution valve according to an embodiment of the present invention.
Figure 2:
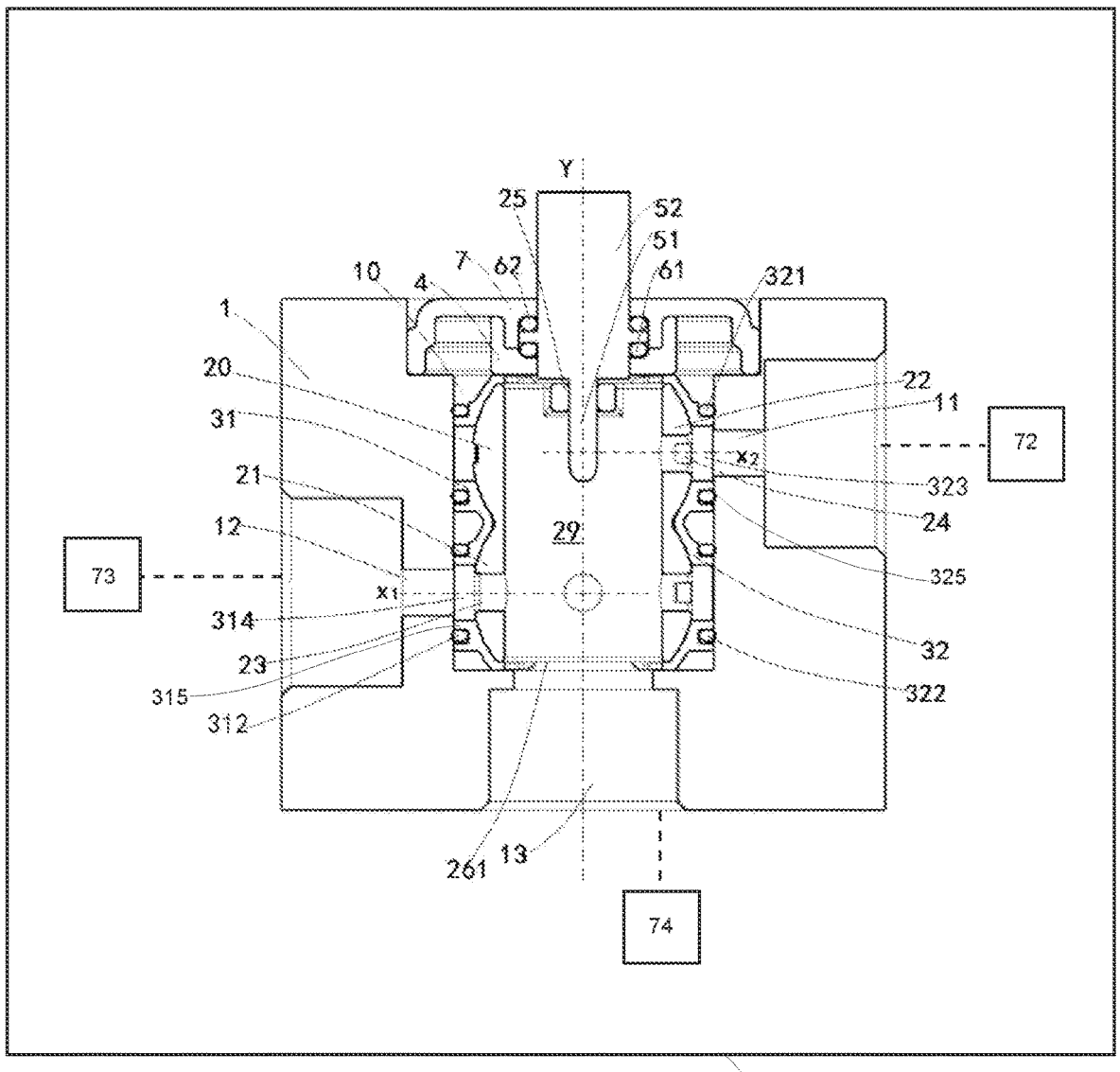
FIG. 2 shows a longitudinal sectional view of a distribution valve according to an embodiment of the present invention.

First of all, reference is made to FIGS. 1 and 2, which show an exploded view and a longitudinal sectional view respectively of a distribution valve according to an embodiment of the present invention. The distribution valve according to an embodiment of the present invention comprises: a housing 1, comprising a valve chamber 10, a housing fluid port 13, a housing first port 12 and a housing second port 11. The housing fluid port 13, housing first port 12 and housing second port 11 are each in communication with the valve chamber 10. As shown in the figures, the housing first port 12 may be located at a first axial position $x_1$, and the housing second port 11 may be located at a second axial position $x_2$. A spool 2 is mounted in the valve chamber 10 of the housing 1, and can rotate relative to the housing 1 along an axial axis Y; the direction of the axial axis may be referred to as the axial direction. The spool 2 comprises a sidewall 20, a spool chamber 29, a spool fluid port 261, a spool first port 23 and a spool second port 24. The spool fluid port 261, spool first port 23 and spool second port 24 are each in communication with the spool chamber 29. The sidewall 20 comprises a first spheroidal segment 21 and a second spheroidal segment 22; the spool first port 23 is disposed in the first spheroidal segment 21, and the spool second port 24 is disposed in the second spheroidal segment 22. The spool first port 23 may be located at the first axial position $x_1$, and the spool second port 24 may be located at the second axial position $x_2$. An intermediate member is mounted between the housing 1 and the spool 2. The intermediate member is fixed relative to the housing 1, and is in sliding contact with the sidewall 20 of the spool 2 in a sealed manner. The intermediate member comprises an intermediate first port 314 and an intermediate second port 321; the intermediate first port 314 is in communication with the housing first port 12, and the intermediate second port 321 is in communication with the housing second port 11. When the spool first port 23 and the intermediate first port 314 overlap, a first valve port is defined, and when the spool second port 24 and the intermediate second port 321 overlap, a second valve port is defined, wherein the degree of opening of the first valve port and the second valve port changes as the spool 2 rotates relative to the housing 1.

The housing 1 may have a top opening, to allow the intermediate member and the spool 2 to be mounted in the housing 1; the top opening is then closed by a cover 7. In some embodiments, the spool 2 is connected to a first end 51 of a driving member 5; a second end 52 of the driving member 5 may be connected to a driving apparatus such as a motor, and rotation of the spool 2 can thereby be driven by the motor. In some embodiments, the spool 2 may be connected via the driving member 5 to an apparatus such as a stepper motor, the stepper motor being further controlled by a controller, and an angular position of the spool 2 relative to the housing 1 can thereby be precisely controlled. In some embodiments, the spool 2 can rotate through 360 degrees relative to the housing 1, and the range of the angular position may be marked as 0 to 360 degrees; in other embodiments, the spool 2 can only rotate through a limited angle, e.g. can only rotate within a range of 0 to 180 degrees or another suitable range. When the spool 2 rotates relative to the housing 1, the overlapping state of the spool first port 23 and the intermediate first port 314 changes, thereby changing the degree of opening of the first valve port, and similarly, the overlapping state of the spool second port 24 and the intermediate second port 321 changes, changing the degree of opening of the second valve port. Furthermore, since the intermediate member is fixed relative to the housing 1, during rotation of the spool 2, the intermediate first port 314 maintains communication with the housing first port 12, and the intermediate second port 321 maintains communication with the housing second port 11. A fluid entering through the housing fluid port 13 and the spool fluid port 261 has its flow split on the basis of the degrees of opening of the first valve port and the second valve port, and flows out through the first valve port and the second valve port in a certain ratio. A one-to-one correspondence exists between the degrees of opening of the first valve port and the second valve port and the angular position of the spool 2 relative to the housing 1, and this correspondence may be obtained by simulation or actual tests; thus, the ratio and flow rates of fluid flowing out through the first valve port and the second valve port can be adjusted by adjusting the angular position of the spool 2 relative to the housing 1. The first valve port and the second valve port may be connected to two downstream branches respectively; thus, the distribution valve according to an embodiment of the present invention realizes flow distribution control of two branches via a single valve. The adjustability of the flow distribution may be realized through design of the shapes and positions, etc. of the housing first port 12 and spool first port 23, and the housing second port 11 and spool second port 24 respectively. It should be understood that the mating of the intermediate member with the spool 2 having the first spheroidal segment 21 and second spheroidal segment 22 enables the intermediate member to envelop the spool, realizing good sealing during rotation of the spool.

Figure 3:
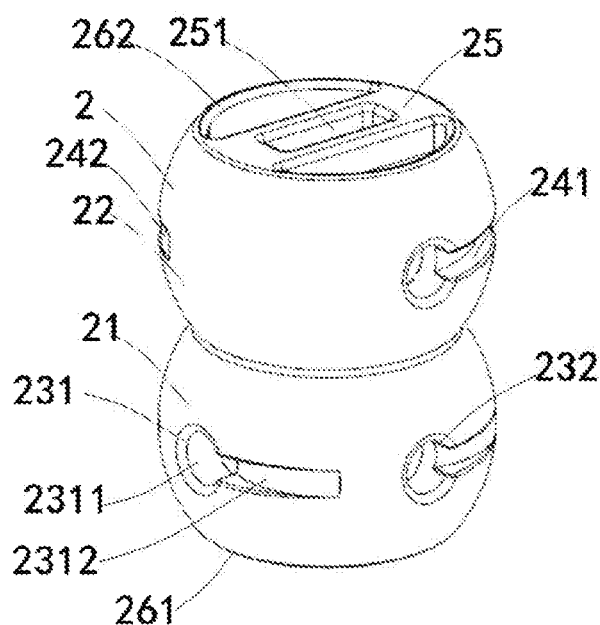
FIG. 3 shows a three-dimensional drawing of a spool of a distribution valve according to an embodiment of the present invention.

In some embodiments, the distribution valve further comprises a sealing member, which is mounted between the intermediate member and the housing in an elastically pre-compressed manner; in particular, flanges 315, 325 are provided at the periphery of the intermediate first port 314 and the intermediate second port 323, and the sealing member comprises sealing rings 312, 321 mounted outside the flanges 315, 325. In the embodiment shown, sealing members are disposed between the intermediate first port 314 and the housing first port 12 and between the intermediate second port 323 and the housing second port 11. In some embodiments, the intermediate first port 314 and intermediate second port 323 abut the housing first port 12 and housing second port 11 respectively; the intermediate first port 314 and intermediate second port 323 have flanges 315, 325, and the sealing rings 312, 321 are disposed outside the flanges 315, 325. A tight seal between the intermediate member and the housing 1 is achieved through this arrangement. Referring to FIGS. 1 and 3, in some embodiments, the external form of the sidewall 20 of the spool 2 may be peanut-shaped. In some embodiments, the intermediate member has a shape matched to the external form of the sidewall of the spool 2, in order to fit onto the spool 2, and form a tight seal. As can be seen more clearly in FIG. 1, the intermediate member may comprise a first intermediate member half 31 and a second intermediate member half 32, which envelop the spool 2 from two sides of the sidewall of the spool; the first intermediate member half 31 and second intermediate member half 32 have shapes matched to the external form, e.g. peanut shape, of the spool 2. In an alternative embodiment, the intermediate member may also be formed by a single component or a greater number of components; for example, in the case where the positions of the housing first port and housing second port are close to each other or located on the same side, just one integrally formed intermediate member may be provided. In some embodiments, the intermediate member such as the first intermediate member half 31 and/or the second intermediate member half 32 has the intermediate first port 314 and intermediate second port 323 aligned with the housing first port 12 and housing second port 11. In the embodiment shown in FIG. 1, the second intermediate member half 32 has the intermediate second port 323 and an optional additional opening 324, wherein the intermediate second port 323 corresponds to the housing first port 11 of the housing 1. A sealing member may be disposed at the junction between the intermediate second port 323 and the housing first port 11 of the housing 1, e.g. the sealing ring 321 outside the flange 325 of the intermediate second port 323, and the other additional opening 324 is sealed through abutment of a sealing ring 322 on an inner wall of the housing 1; alternatively, the additional opening 324 need not be provided. The first intermediate member half 31 may have a similar structure. In addition, the intermediate member such as the first intermediate member half 31 and/or the second intermediate member half 32 may have a stop part to define the position of the first intermediate member half 31 and/or the second intermediate member half 32 in the housing 1, thus the intermediate member will not rotate with the spool 2. In some embodiments, the stop part of the first intermediate member half 31 and/or the second intermediate member half 32 may be a retaining edge 326, 327 at two sides.

Figure 4:
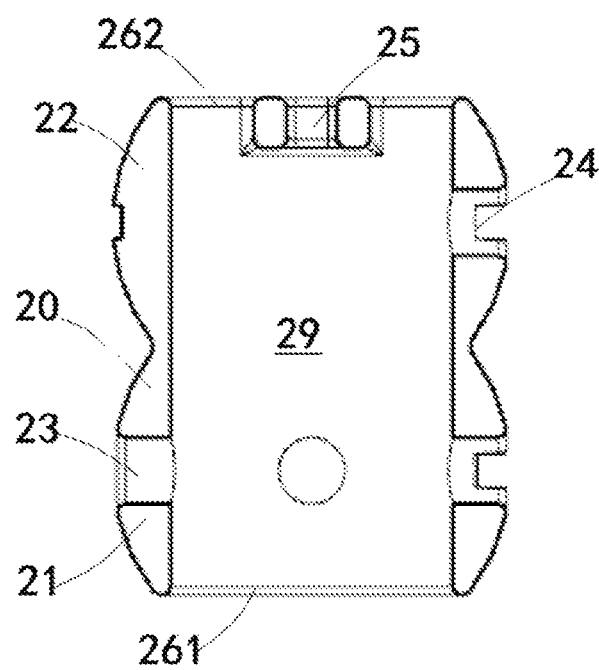
FIG. 4 shows a longitudinal sectional view of a spool of a distribution valve according to an embodiment of the present invention.

In some embodiments, as shown in FIG. 4, the sidewall 20 may surround the axial axis and form the cylindrical spool chamber 29 at an inner side thereof; the spool fluid port 261 may be located at a first axial end of the spool 2; the spool first port 23 and spool second port 24 may be located in the first spheroidal segment 21 and the second spheroidal segment 22 respectively, e.g. at positions where the first spheroidal segment 21 and the second spheroidal segment 22 have maximum diameters in a cross section perpendicular to the axial direction, in order to provide better sealing. In some embodiments, the spool first port 23 and spool second port 24 are located at middle positions of the first spheroidal segment 21 and the second spheroidal segment 22 respectively, in order to provide better sealing. In some embodiments, the spool first port 23 and spool second port 24 are located at positions of maximum wall thickness of the first spheroidal segment 21 and the second spheroidal segment 22 respectively, i.e. positions where the thickness of the sidewall is greatest; this facilitates the formation of a second segment 2312 of a sub-port having a different sunk depth as described above, and also helps to provide better sealing.

Continuing to refer to FIGS. 3 and 4, a particular structure of the spool in some embodiments according to the present invention is described. In some embodiments, the spool 2 comprises the first axial end along the axial axis, a second end 262 opposite the first axial end, and the sidewall 20 surrounding the axial axis. In some embodiments, the spool first port 23 and the spool second port 24 are defined at a first axial position and a second axial position of the sidewall 20 respectively. In some embodiments, the first axial end comprises the spool fluid port 261, the housing fluid port 13 of the housing 1 may also be in the axial direction, and when the spool 2 rotates relative to the housing 1, the spool fluid port 261 and the housing fluid port 13 remain overlapped at all times, thereby maintaining stability of the fluid entering the distribution valve. In some embodiments, a structure for receiving torque from the driving apparatus may be disposed at the second end 262 of the spool; for example, the second end 262 of the spool may open or close the spool chamber 29. In some embodiments, the second end 262 of the spool may comprise an open opening as shown in the figure; a connector 25 spans the open opening and may have a rectangular hole 251, in order to be connected to the driving member 5 and receive rotational torque. As shown in FIGS. 1 and 2, a support member 4, a first sealing ring 61, a second sealing ring 62 and a cover 7 are provided at the second end of the spool 2 to realize sealing. In some embodiments, the second end 262 of the spool 2 may be closed. In some embodiments, the first end of the spool 2 may also be designed to receive torque.

In some embodiments, the spool first port 23 and/or spool second port 24 may only comprise a single port or may comprise multiple sub-ports. In the embodiment shown, the spool first port 23 comprises three sub-ports 231, 232 (the other sub-port not being visible in the figures) which are uniformly distributed along a circumference, and the spool second port 24 comprises two sub-ports 241, 242 which are uniformly distributed along a circumference. In an alternative embodiment, the quantity and positions of sub-ports may vary according to actual needs. Different designs of position and quantity of single ports or sub-ports can realize different flow distributions. In some embodiments, the shapes and positions of the housing first port 12 and housing second port 11 of the housing 1 may also change, and the housing first port 12 and housing second port 11 of the housing 1 may also comprise single ports or multiple sub-ports. In some embodiments, at least some or all of the single ports or multiple sub-ports of the spool 2 comprise: a first segment 2311 penetrating the sidewall 20, and the second segment 2312 which extends from the first segment 2311 in a circumferential direction and does not penetrate the sidewall 20. In some embodiments, the first segment 2311 is circular and the second segment 2312 is rectangular. In an alternative embodiment, the first segment 2311 and second segment 2312 in the sub-port of the spool 2 may have another suitable shape. As shown in the figures, in some embodiments, the depth to which the second segment 2312 is sunk into the sidewall 20 gradually decreases in a direction away from the first segment 2311. As shown in FIG. 3, the second segment 2312 of the sub-port 231 of the spool 2 has a first end connected to the first segment 2311 of the sub-port, and an opposite second end; the depth to which the second segment 2312 of the sub-port 231 is sunk into the sidewall 20 of the spool gradually decreases from a maximum depth (penetrating the sidewall) at the first end of the second segment to zero depth at the second end thereof. Through this arrangement, when the spool 2 rotates relative to the housing 1, several situations are possible: for example, when the first segment 2311 of the sub-port completely or partially overlaps with the housing first port 12, the minimum cross-sectional area of the first valve port is substantially equal to the area of the overlapping part; as another example, when the second segment 2312 of the sub-port overlaps with the housing first port 12, fluid will flow out along the second segment 2312 of the sub-port in a circumferential direction, in which case a first valve port having a smaller cross-sectional area is defined. This structure realizes distribution ratio adjustment over a large range between the first valve port and second valve port of the distribution valve, and fine adjustment.

Figure 5:
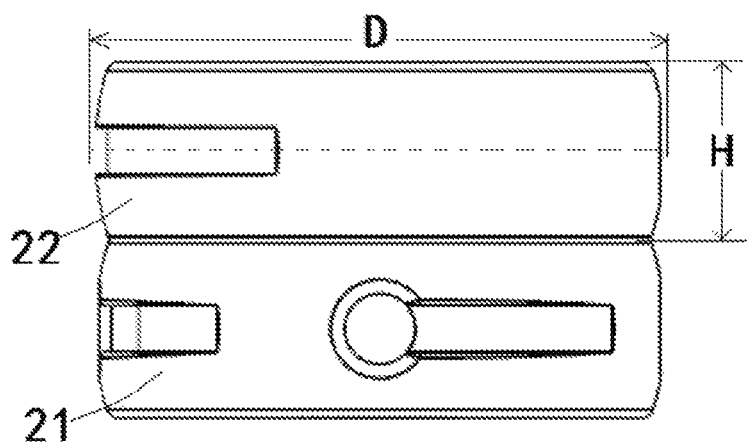
FIG. 5 shows a side view of a distribution valve according to an embodiment of the present invention.

Reference is now made to FIG. 5, which shows another embodiment according to the present invention. In this embodiment, the first spheroidal segment 21 and/or the second spheroidal segment 22 has height H and diameter D, wherein the ratio of the height H to the diameter D of the first spheroidal segment 21 and/or the second spheroidal segment 22 is less than 0.5, or less than 0.4, or less than 0.3. The spool having this parameter has a flat form, providing a distribution valve that is more compact and smaller in volume.

Furthermore, a refrigeration system 71 is also provided, comprising the distribution valve according to various embodiments of the present invention; the refrigeration system 71 may for example be used in a motor vehicle or another environment. For example, the refrigeration system 71 comprises a compressor 74, a first heat exchanger 73, a second heat exchanger 72 and a distribution valve; the compressor 74 is in communication with the housing fluid port 13, the first heat exchanger 73 is in communication with the housing first port 12, and the second heat exchanger 72 is in communication with the housing second port 11.

The invention claimed is:
1. A distribution valve, comprising:
a housing (1), comprising a valve chamber (10), a housing fluid port (13), a housing first port (12) and a housing second port (11), wherein the housing fluid port (13), the housing first port (12) and the housing second port (11) are each in communication with the valve chamber (10);
a spool (2) in the housing (1), the spool (2) being mounted in the valve chamber so as to be rotatable relative to the housing (1) along an axial axis (Y), and the spool (2) comprising a sidewall (20), a spool chamber (29), a spool fluid port (261), a spool first port (23) and a spool second port (24), wherein the spool fluid port (261), the spool first port (23) and the spool second port (24) are each in communication with the spool chamber (29), and the sidewall (20) comprises a first spheroidal segment (21) and a second spheroidal segment (22), the spool first port (23) being disposed in the first spheroidal segment (21), and the spool second port (24) being disposed in the second spheroidal segment (22); and
an intermediate member, mounted between the housing (1) and the spool (2), the intermediate member being fixed relative to the housing (1) and being in sliding contact with the sidewall (20) of the spool (2) in a sealed manner, the intermediate member comprising an intermediate first port (314) and an intermediate second port (323), the intermediate first port (314) being in communication with the housing first port (12), and the intermediate second port (323) being in communication with the housing second port (11);
a first valve port being defined when the spool first port (23) and the intermediate first port (314) overlap, and a second valve port being defined when the spool second port (24) and the intermediate second port (323) overlap, wherein a degree of opening of the first valve port and the second valve port changes as the spool (2) rotates relative to the housing (1), wherein the intermediate member comprises a first intermediate member half (31) and a second intermediate member half (32) which envelop the spool from two sides of the sidewall (20) of the spool (2), the first intermediate member half

(31) and/or the second intermediate member half (32) having a stop part in order to define a position of the first intermediate member half (31) and/or the second intermediate member half (32) in the housing (1).

2. The distribution valve as claimed in claim 1, wherein the distribution valve further comprises a sealing member, which is mounted between the intermediate member and the housing in an elastically pre-compressed manner.

3. The distribution valve as claimed in claim 1, wherein the spool first port (23) and/or the spool second port (24) comprises a single port or multiple sub-ports (231, 232, 241, 242); at least one of the single port or the multiple sub-ports (231, 232, 241, 242) comprises: a first segment (2311) penetrating the sidewall (20), and a second segment (2312) which extends from the first segment (2311) in a circumferential direction and does not penetrate the sidewall; the first segment (2311) is circular and the second segment (2312) is rectangular.

4. The distribution valve as claimed in claim 3, wherein a depth to which the second segment (2312) is sunk into the sidewall (20) gradually decreases in a direction away from the first segment (2311).

5. The distribution valve as claimed in claim 1, wherein the spool first port (23) and the spool second port (24) are respectively located at positions where the first spheroidal segment (21) and the second spheroidal segment (22) have maximum diameters in a cross section perpendicular to an axial direction, or the spool first port (23) and the spool second port (24) are located at positions of maximum wall thickness of the first spheroidal segment (21) and the second spheroidal segment (22) respectively.

6. The distribution valve as claimed in claim 5, wherein a ratio of height to diameter of the first spheroidal segment (21) and/or the second spheroidal segment (22) is less than 0.5.

7. The distribution valve as claimed in claim 1, wherein the sidewall (20) surrounds the axial axis and forms the cylindrical spool chamber (29) at an inner side thereof, and the spool fluid port (261) is located at a first axial end of the spool (2).

8. The distribution valve as claimed in claim 7, wherein the spool (2) comprises a second end (262) which is axially opposite the first axial end; a structure for receiving torque from a driving apparatus is disposed at the second end (262) of the spool, and the second end (262) of the spool opens or closes the spool chamber (29).

9. The distribution valve as claimed in claim 2, wherein flanges (315, 325) are provided at the periphery of the intermediate first port (314) and the intermediate second port (323), and the sealing member comprises sealing rings (312, 321) mounted outside the flanges (315,325).

10. The distribution valve as claimed in claim 1, wherein the stop part of the first intermediate member half (31) and/or the second intermediate member half (32) is a retaining edge (326, 327) at two sides.

11. A refrigeration system (71) comprising a distribution valve, a compressor (74), a first heat exchanger (73), and a second heat exchanger (72);
wherein the distribution valve includes:
a housing (1), comprising a valve chamber (10), a housing fluid port (13), a housing first port (12) and a housing second port (11), wherein the housing fluid port (13), the housing first port (12) and the housing second port (11) are each in communication with the valve chamber (10);
a spool (2) in the housing (1), the spool (2) being mounted in the valve chamber so as to be rotatable relative to the housing (1) along an axial axis (Y), and the spool (2) comprising a sidewall (20), a spool chamber (29), a spool fluid port (261), a spool first port (23) and a spool second port (24), wherein the spool fluid port (261), the spool first port (23) and the spool second port (24) are each in communication with the spool chamber (29), and the sidewall (20) comprises a first spheroidal segment (21) and a second spheroidal segment (22), the spool first port (23) being disposed in the first spheroidal segment (21), and the spool second port (24) being disposed in the second spheroidal segment (22); and
an intermediate member, mounted between the housing (1) and the spool (2), the intermediate member being fixed relative to the housing (1) and being in sliding contact with the sidewall (20) of the spool (2) in a sealed manner, the intermediate member comprising an intermediate first port (314) and an intermediate second port (323), the intermediate first port (314) being in communication with the housing first port (12), and the intermediate second port (323) being in communication with the housing second port (11);
a first valve port being defined when the spool first port (23) and the intermediate first port (314) overlap, and a second valve port being defined when the spool second port (24) and the intermediate second port (323) overlap, wherein a degree of opening of the first valve port and the second valve port changes as the spool (2) rotates relative to the housing (1), and
wherein the compressor is in communication with the housing fluid port (13), the first heat exchanger is in communication with the housing first port (12), and the second heat exchanger is in communication with the housing second port (11).

12. The refrigeration system as claimed in claim 11, wherein the distribution valve further comprises a sealing member, which is mounted between the intermediate member and the housing in an elastically pre-compressed manner.

13. The refrigeration system as claimed in claim 11, wherein the intermediate member comprises a first intermediate member half (31) and a second intermediate member half (32) which envelop the spool from two sides of the sidewall (20) of the spool (2), the first intermediate member half (31) and/or the second intermediate member half (32) having a stop part in order to define a position of the first intermediate member half (31) and/or the second intermediate member half (32) in the housing (1).

14. The refrigeration system as claimed in claim 11, wherein the spool first port (23) and/or the spool second port (24) comprises a single port or multiple sub-ports (231, 232, 241, 242); at least one of the single port or the multiple sub-ports (231, 232, 241, 242) comprises: a first segment (2311) penetrating the sidewall (20), and a second segment (2312) which extends from the first segment (2311) in a circumferential direction and does not penetrate the sidewall; the first segment (2311) is circular and the second segment (2312) is rectangular.

15. The refrigeration system as claimed in claim 14, wherein a depth to which the second segment (2312) is sunk into the sidewall (20) gradually decreases in a direction away from the first segment (2311).

16. The refrigeration system as claimed in claim 11, wherein the spool first port (23) and the spool second port (24) are respectively located at positions where the first spheroidal segment (21) and the second spheroidal segment (22) have maximum diameters in a cross section perpendicular to an axial direction, or the spool first port (23) and the spool second port (24) are located at positions of maximum wall thickness of the first spheroidal segment (21) and the second spheroidal segment (22) respectively.

17. The refrigeration system as claimed in claim 16, wherein a ratio of height to diameter of the first spheroidal segment (21) and/or the second spheroidal segment (22) is less than 0.5.

18. The refrigeration system as claimed in claim 11, wherein the sidewall (20) surrounds the axial axis and forms the cylindrical spool chamber (29) at an inner side thereof, and the spool fluid port (261) is located at a first axial end of the spool (2).

19. The refrigeration system as claimed in claim 18, wherein the spool (2) comprises a second end (262) which is axially opposite the first axial end; a structure for receiving torque from a driving apparatus is disposed at the second end (262) of the spool, and the second end (262) of the spool opens or closes the spool chamber (29).

20. A distribution valve, comprising:
- a housing (1), comprising a valve chamber (10), a housing fluid port (13), a housing first port (12) and a housing second port (11), wherein the housing fluid port (13), the housing first port (12) and the housing second port (11) are each in communication with the valve chamber (10);
- a spool (2) in the housing (1), the spool (2) being mounted in the valve chamber (10) so as to be rotatable relative to the housing (1) along an axial axis (Y), and the spool (2) comprising a sidewall (20), a spool chamber (29), a spool fluid port (261), a spool first port (23) and a spool second port (24), wherein the spool fluid port (261), the spool first port (23) and the spool second port (24) are each in communication with the spool chamber (29), and the sidewall (20) comprises a first spheroidal segment (21) and a second spheroidal segment (22), the spool first port (23) being disposed in the first spheroidal segment (21), and the spool second port (24) being disposed in the second spheroidal segment (22); and
- an intermediate member, mounted between the housing (1) and the spool (2), the intermediate member being fixed relative to the housing (1) and being in sliding contact with the sidewall (20) of the spool (2) in a sealed manner, the intermediate member comprising an intermediate first port (314) and an intermediate second port (323), the intermediate first port (314) being in communication with the housing first port (12), and the intermediate second port (323) being in communication with the housing second port (11);
- a first valve port being defined when the spool first port (23) and the intermediate first port (314) overlap, and a second valve port being defined when the spool second port (24) and the intermediate second port (323) overlap,
- wherein a degree of opening of the first valve port and the second valve port changes as the spool (2) rotates relative to the housing (1),
- wherein the spool first port (23) and the spool second port (24) are respectively located at positions where the first spheroidal segment (21) and the second spheroidal segment (22) have maximum diameters in a cross section perpendicular to an axial direction, or the spool first port (23) and the spool second port (24) are located at positions of maximum wall thickness of the first spheroidal segment (21) and the second spheroidal segment (22) respectively, and
- wherein a ratio of height to diameter of the first spheroidal segment (21) and/or the second spheroidal segment (22) is less than 0.5.

* * * * *